(12) United States Patent
Koshiba et al.

(10) Patent No.: US 10,408,174 B2
(45) Date of Patent: Sep. 10, 2019

(54) INTERNAL COMBUSTION ENGINE AND METHOD FOR MANUFACTURING THE SAME

(71) Applicant: Mitsubishi Heavy Industries Engine & Turbocharger, Ltd., Kanagawa (JP)

(72) Inventors: Yuki Koshiba, Tokyo (JP); Yuji Oda, Tokyo (JP); Satoshi Yamada, Tokyo (JP); Hiromi Komatsu, Tokyo (JP)

(73) Assignee: Mitsubishi Heavy Industries Engine & Turbocharger, Ltd., Kanagawa (JP)

( * ) Notice: Subject to any disclaimer, the term of this patent is extended or adjusted under 35 U.S.C. 154(b) by 54 days.

(21) Appl. No.: 15/039,010

(22) PCT Filed: Nov. 27, 2013

(86) PCT No.: PCT/JP2013/081870
§ 371 (c)(1),
(2) Date: May 24, 2016

(87) PCT Pub. No.: WO2015/079512
PCT Pub. Date: Jun. 4, 2015

(65) Prior Publication Data
US 2016/0377036 A1 Dec. 29, 2016

(51) Int. Cl.
*F02F 1/42* (2006.01)
*F02B 31/00* (2006.01)
(Continued)

(52) U.S. Cl.
CPC ....... *F02M 35/10262* (2013.01); *F02B 31/00* (2013.01); *F02F 1/4228* (2013.01);
(Continued)

(58) Field of Classification Search
CPC .......... F02M 35/10262; F02M 35/112; F02M 35/10072; F02B 31/00
See application file for complete search history.

(56) References Cited

U.S. PATENT DOCUMENTS

| 4,450,793 A | * | 5/1984 | Sumiyoshi | .............. | F02B 31/00 |
| | | | | | 123/184.39 |
| 2002/0050261 A1 | * | 5/2002 | Miyahara | ............ | B29C 45/0062 |
| | | | | | 123/184.61 |

(Continued)

FOREIGN PATENT DOCUMENTS

| JP | S5644455 A | 4/1981 |
| JP | S56106029 A | 8/1981 |

(Continued)

OTHER PUBLICATIONS

Notification Concerning Filing of Amendments of the Claims, App. No. PCT/JP2013/081870, Filed Nov. 27, 2013, dated Apr. 7, 2014, 1 Page.

(Continued)

*Primary Examiner* — Jacob M Amick
*Assistant Examiner* — Charles Brauch
(74) *Attorney, Agent, or Firm* — Berkeley Law & Technology Group, LLP

(57) ABSTRACT

There is provided an internal combustion engine in which respective combustion states of cylinders can be uniformized with a simple configuration. A central axis (CL1) of a connecting part (7) of one of air supply ports (5) inclines with a predetermined inclination angle in a direction away from an air supply inlet (3) with respect to a y direction orthogonal to an x direction in which an air supply manifold 1 extends, and an inclination angle of the connecting part (7) of the one of the air supply ports (5) is larger than an inclination angle of the connecting part (7) of other air supply ports (5) located on a side closer to the air supply inlet (3) than the one of the air supply ports (5).

5 Claims, 9 Drawing Sheets

(51) Int. Cl.
  *F02M 35/10* (2006.01)
  *F02M 35/104* (2006.01)
  *F02M 35/112* (2006.01)
(52) U.S. Cl.
  CPC ....... *F02F 1/4235* (2013.01); *F02M 35/1045* (2013.01); *F02M 35/10052* (2013.01); *F02M 35/10072* (2013.01); *F02M 35/112* (2013.01); *F02M 35/10347* (2013.01); *Y02T 10/146* (2013.01)

(56) References Cited

U.S. PATENT DOCUMENTS

| | | | | |
|---|---|---|---|---|
| 2005/0115540 | A1* | 6/2005 | Yi | F02B 31/02 123/308 |
| 2006/0180114 | A1* | 8/2006 | Abe | F02M 35/10026 123/184.34 |
| 2011/0017172 | A1* | 1/2011 | Shigenaga | F02D 13/0265 123/406.26 |
| 2012/0079824 | A1* | 4/2012 | Son | F02B 33/40 60/602 |
| 2013/0118433 | A1 | 5/2013 | Tochizawa | |

FOREIGN PATENT DOCUMENTS

| | | |
|---|---|---|
| JP | S58172013 U | 11/1983 |
| JP | 11350963 A | 12/1999 |
| JP | 2003074357 A | 3/2003 |
| JP | 2008215155 A | 9/2008 |
| JP | 20137360 A | 1/2013 |
| JP | 2013133816 A | 7/2013 |
| WO | 2012014377 A1 | 2/2012 |
| WO | 2015079512 A1 | 6/2015 |

OTHER PUBLICATIONS

International Search Report, App. No. PCT/JP2013/081870, dated Jan. 28, 2014, 5 Pages.
Written Opinion of the International Searching Authority, App. No. PCT/JP2013/081870, dated Jan. 28, 2014, 8 Pages.
Office Action, Japanese App. No. 2015-550249, dated Mar. 28, 2017, 9 Pages.
Japanese Office Action, JP App No. 2015-550249, dated Jul. 31, 2018, 6 Pages.

* cited by examiner

INTERNAL COMBUSTION ENGINE AND METHOD FOR MANUFACTURING THE SAME

TECHNICAL FIELD

The present invention relates to an internal combustion engine provided with a plurality of cylinders, and a method for manufacturing the same.

BACKGROUND ART

There is known a method for generating a swirl in cylinders of an internal combustion engine in an air supply process to improve combustibility.

PTL 1 described below discloses a configuration including an intake port that functions as a swirl generation port for generating a swirl which turns along an inner peripheral surface of each of cylinders. In the invention described in the above literature, an opening position of the intake port that is the swirl generation port provided in a cylinder on a first end side of a cylinder head, and an opening position of the intake port that is the swirl generation port provided in a cylinder on a second end side are deviated from each other in the opposite directions from the centers of the cylinders, so that the turn directions of respective swirls generated in the cylinders are opposite from each other. Consequently, even when a core for an intake port is contracted during manufacture, the directions in which the respective opening positions of the intake ports are deviated become the same, and variation in swirl ratios of the cylinders can be suppressed.

Additionally, as described in the following PTL 2, there is known an internal combustion engine in which swirl chambers are provided in respective ends of a plurality of cylinders. In FIG. 7 and FIG. 8, diagrams disclosed in the above literature are illustrated. FIG. 7 illustrates a periphery of an air supply manifold 101 of the multiple cylinder internal combustion engine having a plurality of cylinders 100. In FIG. 7, only one cylinder 100 among the plurality of cylinders is illustrated as a representative cylinder. To the air supply manifold 101, one air supply introduction pipe 103 that supplies air into the air supply manifold 101 is connected. A downstream end of the air supply introduction pipe 103, that is, a connecting part with the air supply manifold 101 serves as an air supply inlet 103a to the air supply manifold 101. Between the air supply manifold 101 and respective cylinders 100, air supply ports 105 are provided. These air supply ports 105 guide supplied air to the respective cylinders 100. Between the respective air supply ports 105 and the cylinders 100, swirl chambers 107 are provided. Each of the swirl chambers 107 forms a swirl to supplied air which is guided from the respective air supply ports 105. More specifically, as illustrated in FIG. 8, a swirl chamber inlet 107a is provided at a position eccentric from a central axis CL of each of the swirl chambers 107, and supplied air which flows into from this swirl chamber inlet 107a turns around the central axis CL. As illustrated in FIG. 8, when an air supply valve 109 is opened, supplied air obtained after a swirl is formed in each swirl chamber 107 flows into the cylinder 100, and a desired swirl ratio is obtained in the cylinder 100. The arrow A of FIG. 7 illustrates the swirl direction inside the cylinder 100.

In PTL 2, there is a solution for a problem that distances between the air supply inlet (main flow generation starting point) 103a for supplying air to the air supply manifold 101 and the air supply ports 105 are different for the respective air supply ports 105, and therefore flow distributions are different, and variation in respective swirl ratios formed in the swirl chambers 107 occurs. In order to solve this problem, in accordance with relative distances of air supply ports 105 relative to the air supply inlet 103a, the central axes of the air supply ports 105 are eccentric to the central axes CL of the swirl chambers 107, so that the flow distributions of supplied air are adjusted, variation in the respective swirl ratios of the swirl chambers 107 is suppressed, and supplied air flows in the respective cylinders 100 are made to be equal.

CITATION LIST

Patent Literature

{PTL 1}
Japanese Unexamined Patent Application, Publication No. 2008-215155
{PTL 2}
Japanese Unexamined Patent Application, Publication No. 2013-133816

SUMMARY OF INVENTION

Technical Problem

With reference to FIG. 9 and FIG. 10, reasons why the variation in the respective swirl ratios formed in the swirl chambers occurs in accordance with distances between the air supply inlet provided in the air supply manifold and respective air supply ports are more specifically described.

As illustrated in FIG. 9, a plurality of (six in this figure) air supply ports 111 are connected to one side (lower side in this figure) of an air supply manifold 110 while being arranged at equal interval in one direction. Similarly to FIG. 7, swirl chambers 113 are provided in respective downstream ends of the air supply ports 111, and the cylinders 115 are connected to the respective downstream ends of the swirl chambers 113. In FIG. 9, only one cylinder 115 among the plurality of cylinders is illustrated as a representative cylinder.

An air supply inlet 117 for allowing air to be supplied into the air supply manifold 110 is provided in one end (left end in this figure) of the air supply manifold 110. A position of the air supply inlet 117 of FIG. 9 is provided in the one end of the air supply manifold 110. This configuration is different from a configuration of FIG. 7 in which the air supply inlet 103a is located in the connecting part with the air supply manifold.

As illustrated in FIG. 9, air that is supplied from the air supply inlet 117 to the air supply manifold 110 flows along one direction (rightward in this figure) in which the air supply manifold 110 extends. Then, the supplied air flows into each of the plurality of air supply ports 111 connected to the air supply manifold 110. The supplied air that flows into each of the air supply ports 111 has dynamic pressure (inertial force), and therefore when being branched into air supply ports 111, the supplied air flows along each of outer walls 111a located at positions far from the air supply inlet 117 as viewed from the air supply inlet 117. The supplied air that flows along each of the outer walls 111a of the air supply ports 111 flows into the swirl chamber 113, and forms a predetermined swirl in the swirl chamber 113, and thereafter the supplied air flows into each of the cylinders 115 to form an air supply flow having a desired swirl ratio.

However, air supply ports near the air supply inlet 117 (for example, a first air supply port 111 (#1) located at the first position from the left, and a second air supply port 111 (#2) located at the second position from the left in this figure), among the plurality of air supply ports 111, each can obtain a flow distribution in which a main flow flows along the outer wall 111a of the air supply port 111 by dynamic pressure of supplied air. Consequently, desired swirls are obtained in the swirl chambers 113, and therefore desired swirl ratios can be obtained in a first cylinder connected to the first air supply port 111 (#1) and a second cylinder connected to the second air supply port 111 (#2) as illustrated in FIG. 10.

On the other hand, in air supply ports far from the air supply inlet 117 (for example, a third air supply port 111 (#3) located at the third position from the left, a fourth air supply port 111 (#4) located at the fourth position from the left, and a fifth air supply port 111 (#5)) located at the fifth position from the left in this figure, dynamic pressure of supplied air reduces with distance from the air supply inlet 117. Therefore, it is difficult to obtain a flow distribution in which a main flow of supplied air flowing in each air supply port 111 flows along the outer wall 111a. Then, desired swirls cannot be obtained in the swirl chambers 113, and desired swirl ratios cannot be obtained in a third cylinder connected to the third air supply port 111 (#3), a fourth cylinder connected to the fourth air supply port 111 (#4), and a fifth cylinder connected to the fifth air supply port 111 (#5) as illustrated in FIG. 10.

A sixth air supply port 111 (#6) located at the sixth position from the left in FIG. 9, that is, at a right end, is farthest from the air supply inlet 117, and therefore dynamic pressure is the smallest. However, the outer wall 111a of the sixth air supply port 111 (#6) is continuously connected to a downstream end wall 110a located at a lowermost stream of the air supply manifold 110, and therefore supplied air that reaches this downstream end wall 110a flows along the continuously connected outer wall 111a, and it is possible to obtain a flow distribution in which a main flow flows along the outer wall 111a. Therefore, as illustrated in FIG. 10, a swirl ratio larger than the swirl ratios in the third cylinder, the fourth cylinder, and the fifth cylinder is obtained in a sixth cylinder connected to the sixth air supply port 111 (#6).

Thus, there is a problem that air supply flows are different between the respective cylinders depending on positional relations between the air supply inlet provided in the air supply manifold and the respective air supply ports, combustion states cannot be uniformized, efficiency is lowered, and an exhaust gas characteristic of NOx, soot or the like is changed.

The above PTL 1 discloses the invention of suppressing variation in the swirl ratios of the cylinders, but does not include a swirl chamber, and therefore suggestion for solving the problem to obtain equal swirl ratios in the swirl chambers does not exist.

Additionally, the above PTL 2 includes the swirl chambers, but employs a configuration in which a whole of the air supply ports is eccentric to the centers of the swirl chambers, and therefore has a problem that significant design change is required.

The present invention has been made in view of the above circumstances, and an object of the invention is to provide an internal combustion engine in which respective combustion states of cylinders can be uniformized with a simple configuration, and a method for manufacturing the same.

Solution to Problem

A first aspect of the present invention is an internal combustion engine including: a plurality of cylinders arranged at a predetermined interval in one direction; an air supply manifold extending in the one direction and provided with an air supply inlet for allowing air to be supplied; a plurality of swirl chambers connected to ends of the respective cylinders to form swirls; and a plurality of air supply ports that connect the air supply manifold and the respective swirl chambers, wherein the respective air supply ports include connecting parts connected to the air supply manifold, a central axis of the connecting part of one of the air supply ports inclines with a predetermined inclination angle in a direction away from the air supply inlet with respect to an orthogonal direction orthogonal to the one direction in which the air supply manifold extends, and the inclination angle of the connecting part of the one of the air supply ports is larger than an inclination angle of the connecting part of other air supply ports located on a side closer to the air supply inlet than the one of the air supply ports.

In the first aspect of the present invention, air that is supplied from the air supply inlet to the air supply manifold flows along the one direction in which the air supply manifold extends. Then, the supplied air flows into each of the plurality of air supply ports connected to the air supply manifold. The supplied air that flows into each of the air supply ports has dynamic pressure (inertial force), and therefore right after supplied air is branched into the air supply ports, in the connecting parts, the supplied air flows along each of outer walls located at positions far from the air supply inlet as viewed from the air supply inlet. The supplied air that flows along each of the outer walls of the connecting parts of the air supply ports flows into the swirl chamber, and forms a predetermined swirl in the swirl chamber, and thereafter the supplied air flows into each of the cylinders to form an air supply flow having a desired swirl ratio.

An air supply port near the air supply inlet among the plurality of air supply ports can obtain a flow distribution in which a main flow of the supplied air flows along the outer wall of the air supply port by dynamic pressure of the supplied air. When the flow distribution in which the main flow of the supplied air flows along the outer wall of the air supply port is obtained, a long distance between the turning center of a swirl formed in the swirl chamber, and the main flow of the supplied air is obtained, and therefore it is possible to obtain a stronger swirl ratio.

On the other hand, in the air supply port far from the air supply inlet, the dynamic pressure of supplied air reduces with distance from the air supply inlet. Therefore, it is difficult to obtain a flow distribution in which the main flow of supplied air flowing in each air supply port flows along the outer wall. Then, the long distance between the turning center in the swirl chamber, and the main flow of the supplied air cannot be obtained, and a desired swirl ratio cannot be obtained.

Therefore, in the present invention, the central axis of the connecting part of the air supply port is inclined in the direction away from the air supply inlet with respect to the orthogonal direction orthogonal to the one direction in which the air supply manifold extends. Thus, the connecting part is inclined in the direction away from the air supply inlet, so that supplied air that flows into the air supply port is received at a predetermined attack angle by the outer wall. Consequently, the main flow of the supplied air that flows into the air supply port comes close to the outer wall, and flows along the outer wall. As a result, it is possible to obtain the flow distributions in which the main flows flow along the outer walls.

Then, the inclination angle of the connecting part of the one of the air supply ports is made to be larger than the inclination angle of the connecting part of other air supply ports located on the side close to the air supply inlet, so that the connecting part having the smaller dynamic pressure of the supplied air is formed to have a larger inclination angle, and the main flow of the supplied air can flow along the side further closer to the outer wall. Consequently, the flow distribution of supplied air flowing through the air supply port can be adjusted in accordance with the positions of the respective air supply ports in a manner similar to those of other air supply ports, and the flow distributions of supplied air flowing through the swirl chambers can be equalized for the respective air supply ports. Therefore, the swirl ratios in the respective swirl chambers become equal to each other. As a result, flow distributions of supplied air flowing into the cylinders can be made equal for the respective cylinder. The equal air supply flows for the respective cylinders are obtained, and therefore it is possible to make the combustion states of the respective cylinders coincide with each other, and it is possible to suppress the lowering of efficiency or the change of an exhaust gas characteristic.

Additionally, respective combustion states of the cylinders can be uniformized by simple change, that is, by inclination of the connecting parts of the air supply ports, and therefore significant design change such as change in the shape of the whole of the air supply ports is not required.

The inclination angles of the present invention each are determined by a flow distribution of supplied air that flows into the swirl chamber. For example, the lower limit is any of 5°, 8°, and 10°, and the upper limit is any of 60°, 50°, and 30°.

Furthermore, in the internal combustion engine of the present invention, the inclination angles are sequentially set such that the inclination angle of the connecting part of the air supply port located farther from the air supply inlet as viewed from the air supply inlet becomes larger.

The dynamic pressure of supplied air reduces in accordance with a distance from the air supply inlet, and therefore the inclination angles of the connecting parts of the air supply ports are increased, and long flow distances are obtained. Consequently, the main flows of supplied air can be brought close to the outer walls by utilizing inertial force of the supplied air, and therefore even when the dynamic pressure of supplied air is low, it is possible to obtain the flow distribution in which the main flow flows along the outer wall. Therefore, the inclination angles are sequentially set such that the inclination angle of the connecting part of the air supply port located farther from the air supply inlet as viewed from the air supply inlet and having lower dynamic pressure becomes larger, so that the flow distributions of supplied air flowing into the respective swirl chambers can be made equal, and it is possible to obtain the equal air supply flows for the respective cylinders.

Furthermore, in the internal combustion engine of the present invention, the air supply ports are formed by connecting the connecting parts and the swirl chamber introduction parts located on sides closer to the swirl chambers than the connecting parts, the connecting parts are manufactured by an air supply manifold mold for forming the air supply manifold, and the swirl chamber introduction parts are manufactured by a cylinder head mold for forming the swirl chambers and the ends of the cylinders.

The cylinder head mold for forming the swirl chambers and the ends of the cylinders is a mold for determining the shape of a main body side of the internal combustion engine, and therefore it is difficult to frequently change the design of the cylinder head mold. On the other hand, the shape of the air supply manifold mold can be determined separately from the main body of the internal combustion engine, and therefore the design of the air supply manifold mold can be frequently changed compared to the design of the cylinder head mold.

Therefore, in the present invention, the air supply ports are divided into the connecting parts and the swirl chamber introduction parts, so that the swirl chamber introduction parts of the air supply ports, without the change of the shapes, are manufactured by the cylinder head mold, and the connecting parts of the air supply ports, accompanying the change of the shapes, are manufactured by the air supply manifold mold. Consequently, it is possible to manufacture the air supply manifold including the connecting parts of the air supply ports with desired shapes, at a low cost.

A second aspect of the present invention is a method for manufacturing an internal combustion engine, the internal combustion engine including: a plurality of cylinders arranged at a predetermined interval in one direction; an air supply manifold extending in the one direction and provided with an air supply inlet for allowing air to be supplied; a plurality of swirl chambers connected to ends of the respective cylinders to form swirls; and a plurality of air supply ports that connect the air supply manifold and the respective swirl chambers, wherein the respective air supply ports include connecting parts connected to the air supply manifold, a central axis of the connecting part of one of the air supply ports inclines with a predetermined inclination angle in a direction away from the air supply inlet with respect to an orthogonal direction orthogonal to the one direction in which the air supply manifold extends, the inclination angle of the connecting part of the one of the air supply ports is larger than an inclination angle of the connecting part of other air supply ports located on a side closer to the air supply inlet than the one of the air supply ports, and the air supply ports include the connecting parts, and swirl chamber introduction parts connected to the connecting parts and located on sides closer to the swirl chambers than the connecting parts, the method comprising: a connecting part manufacturing step of manufacturing the connecting parts by an air supply manifold mold for forming the air supply manifold; a swirl chamber introduction part manufacturing step of manufacturing the swirl chamber introduction parts by a cylinder head mold for forming the swirl chamber and the ends of the cylinder; and an air supply port manufacturing step of connecting the connecting parts and the swirl chamber introduction parts to manufacture the air supply ports.

The cylinder head mold for forming the swirl chambers and the ends of the cylinders is a mold for determining the shape of a main body side of the internal combustion engine, and therefore it is difficult to frequently change the design of the cylinder head mold. On the other hand, the shape of the air supply manifold mold can be determined separately from the main body of the internal combustion engine, and therefore the design of the air supply manifold mold can be frequently changed compared to the design of the cylinder head mold.

According to the second aspect of the present invention, the air supply ports are divided into the connecting parts and the swirl chamber introduction parts, so that the swirl chamber introduction parts of the air supply ports, without the change of the shapes, are manufactured by the cylinder head mold, and the connecting parts of the air supply ports, accompanying the change of the shapes, are manufactured by the air supply manifold mold. Consequently, it is possible to manufacture the air supply manifold including the connecting parts of the air supply ports with desired shapes, at a low cost.

Advantageous Effects of Invention

According to the present invention, the connecting part of the air supply port is inclined, and the flow distribution of the air supply port is adjusted, so that variation in the air supply flows of the respective cylinders is suppressed, and the combustion states can be uniformized. Consequently, it is possible to minimize the deterioration of the efficiency of the internal combustion engine and the deterioration of an exhaust gas characteristic.

Additionally, simple change such as inclination of the connecting part of the air supply port is simply performed, and therefore significant design change such as change in the shape of the whole of the air supply ports is not required.

DESCRIPTION OF EMBODIMENTS

Hereinafter, an embodiment according to an internal combustion engine and a method for manufacturing the same according to the present invention will be described with reference to the drawings.

Figure 7:
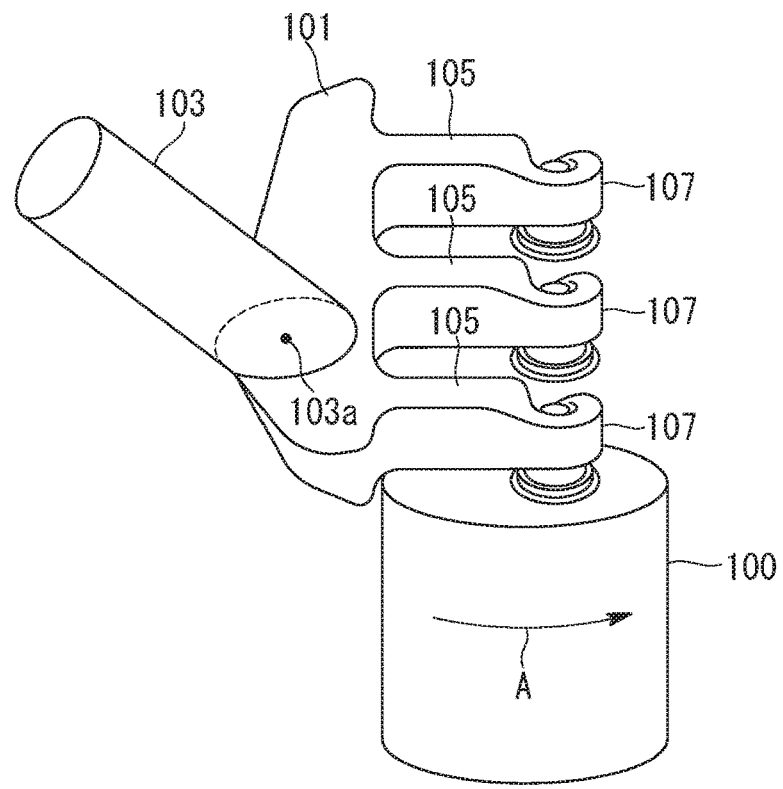
FIG. 7 is a perspective view illustrating a periphery of an air supply manifold of a conventional internal combustion engine.
Figure 9:
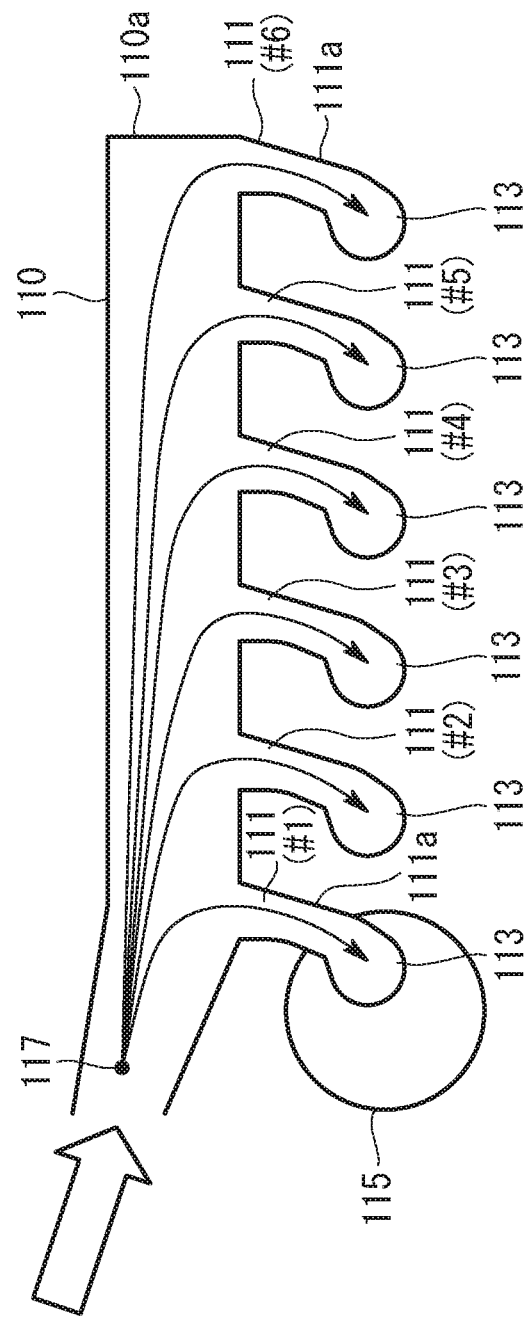
FIG. 9 is a plan view illustrating a periphery of an air supply manifold in order to explain that air supply flows in respective cylinders are different.
Figure 10:
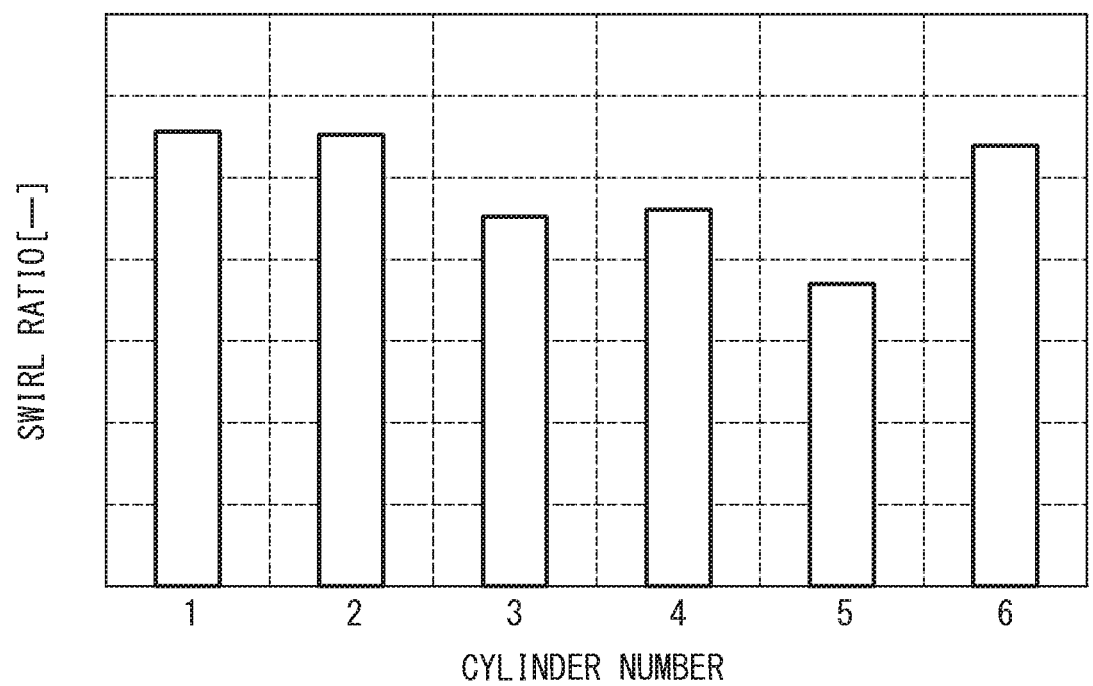
FIG. 10 is a graph illustrating swirl ratios for the respective cylinders of FIG. 9.

The internal combustion engine of the present invention is a multiple cylinder internal combustion engine including a plurality of cylinders similarly to FIG. 7 and FIG. 9.

Figure 1:
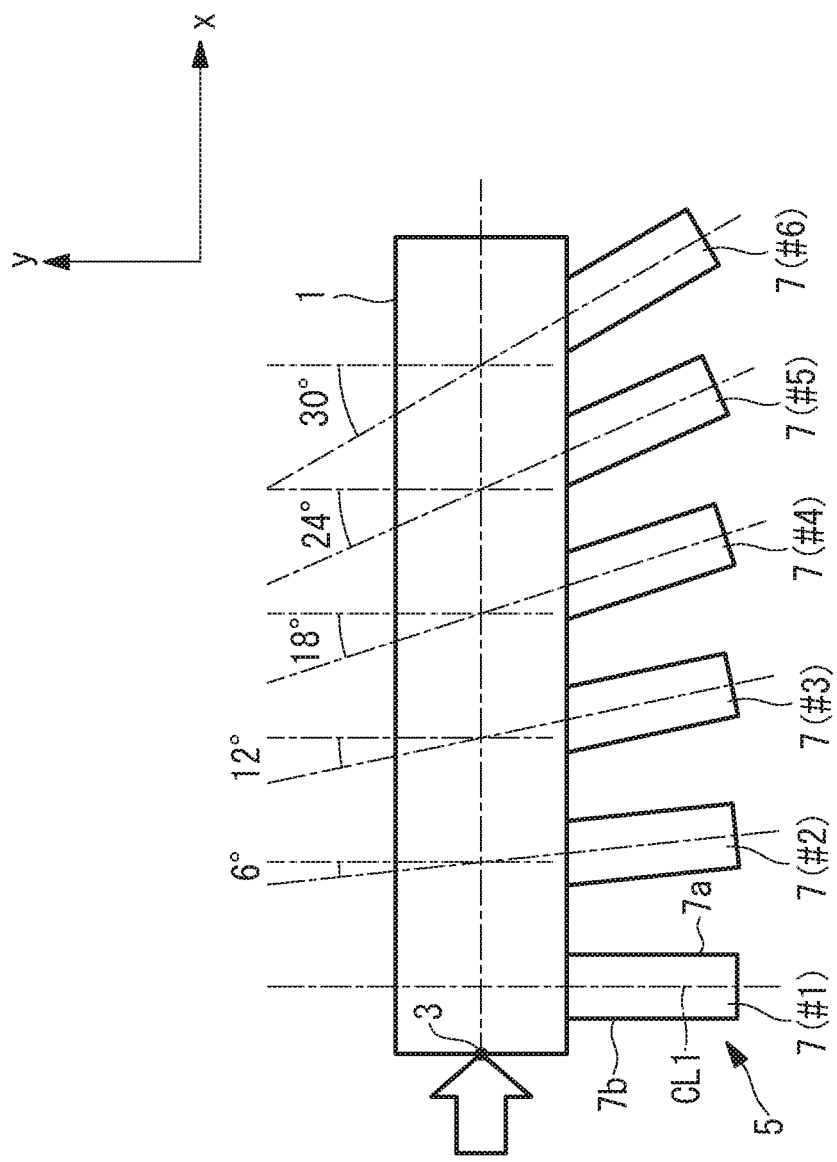
FIG. 1 is a plan view illustrating inclination angles of respective air supply ports connected to an air supply manifold of an internal combustion engine according to an embodiment of the present invention.

FIG. 1 illustrates a periphery of an air supply manifold 1 of the multiple cylinder internal combustion engine. The air supply manifold 1 extends in the x direction (one direction) that is the lateral direction in FIG. 1, and has an end (left end in FIG. 1) provided with an air supply inlet 3 for allowing air to be supplied. The air supply inlet 3 is located at a position of a main flow of air supplied to the air supply manifold 1.

Figure 2:
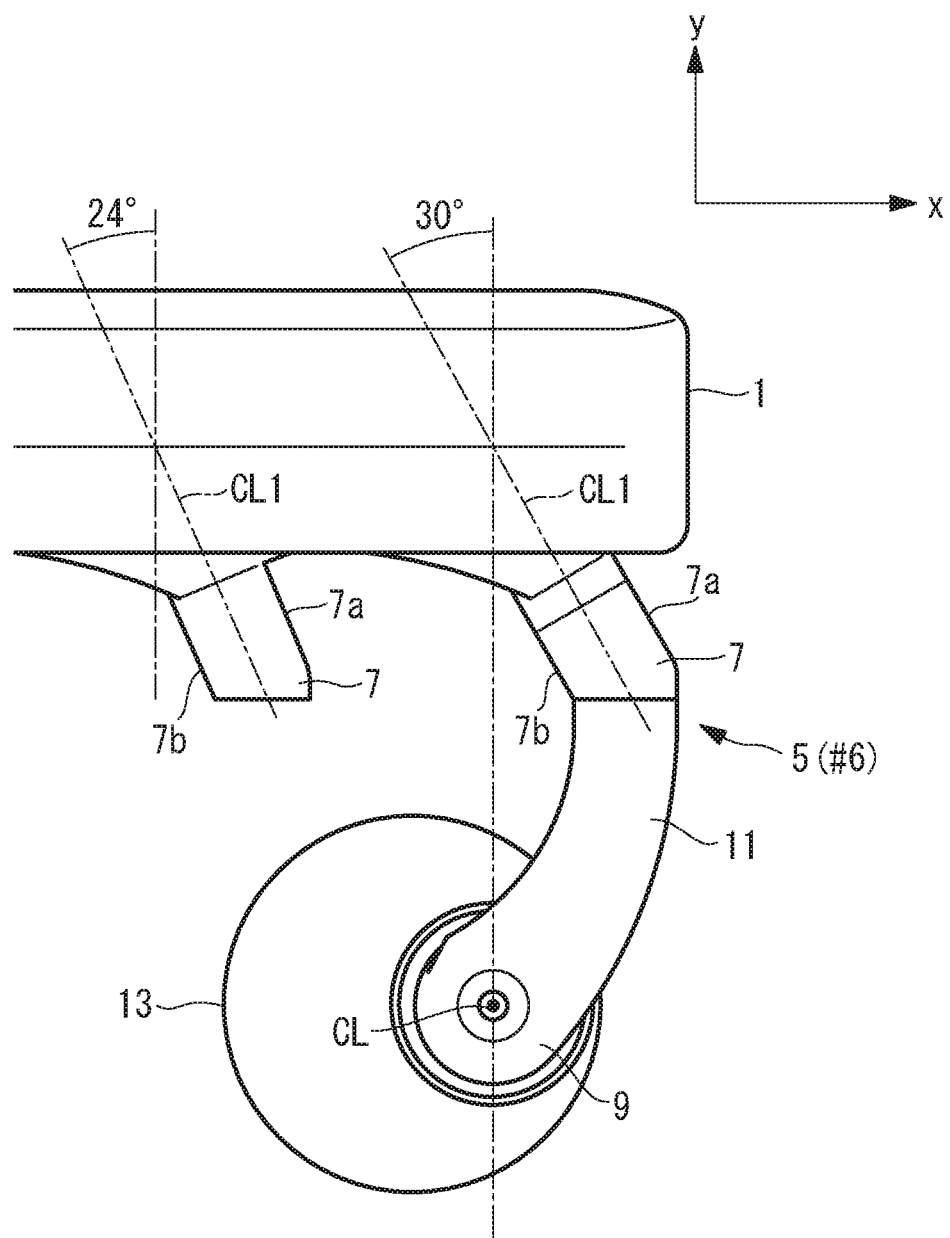
FIG. 2 is a partially enlarged plan view illustrating a vicinity of a sixth air supply port of FIG. 1.

On one side (lower side of this Figure) of the air supply manifold 1, a plurality of (six in this figure) air supply ports 5 is connected while being arranged in the x direction at equal intervals. The air supply ports 5 includes connecting parts 7 located at an inlet side and swirl chamber introduction parts 11 that are connected to respective downstream sides of the connecting parts to guide supplied air to swirl chambers 9, as illustrated in FIG. 2. Each of the connecting parts 7 has an outer wall 7a located far from the air supply inlet 3 as viewed from the air supply inlet 3, and an inner wall 7b located near the air supply inlet 3 as viewed from the air supply inlet 3. The outer wall 7a and the inner wall 7b are provided so as to have substantially the same flow passage cross sectional area at each flow position of supplied air. FIG. 1 illustrates only the connecting parts 7 of the air supply ports 5.

Figure 8:
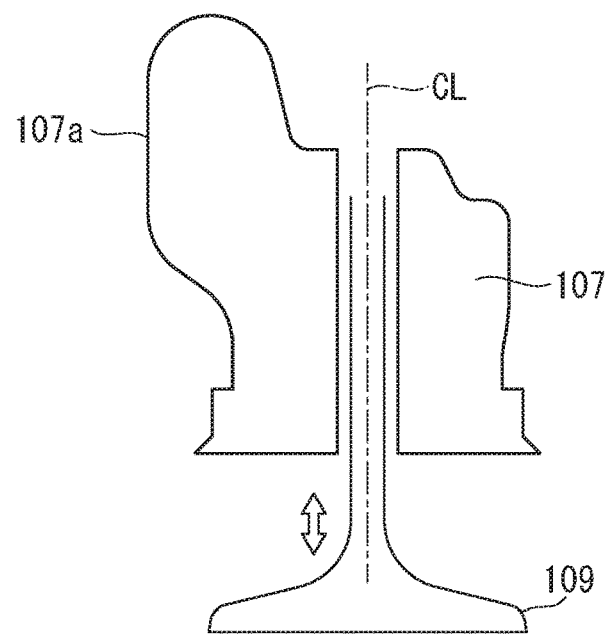
FIG. 8 is a partial enlarged longitudinal section illustrating a configuration of a swirl chamber of FIG. 7.

As illustrated in FIG. 2, each swirl chamber 9 is connected at the downstream side of the air supply port 5. The swirl chamber 9 is connected to an end of each cylinder 13. In each swirl chamber 9, supplied air guided to the swirl chamber inlet turns around a central axis CL to form a predetermined swirl, as described with reference to FIG. 8. The respective swirl chambers 9 connected to the cylinders 13 are formed in the same shape. FIG. 2 illustrates only one cylinder 13 of the plurality of (six in this embodiment) cylinders as a representative cylinder.

The respective cylinders 13 are arranged at equal intervals along the x direction in which the air supply manifold 1 extends. In this embodiment, the six cylinders 13 are provided in accordance with the air supply ports 5 illustrated in FIG. 1, but illustration thereof is omitted in this figure.

As illustrated in FIG. 2, the central axes CL1 of the connecting parts 7 of the air supply ports 5 incline with predetermined inclination angles in a direction away from the air supply inlet 3 (refer to FIG. 1) with respect to the y direction (orthogonal direction) orthogonal to the x direction in which the air supply manifold 1 extends. More specifically, a sixth connecting part 7 (#6) of a sixth air supply port 5 (#6) located at the sixth position from the air supply inlet 3, that is, at a right end has an inclination angle of 30°, and a fifth connecting part 7 (#5) of a fifth air supply port 5 (#5) located at the fifth position from the air supply inlet 3 has an inclination angle of 24°.

Figure 3:
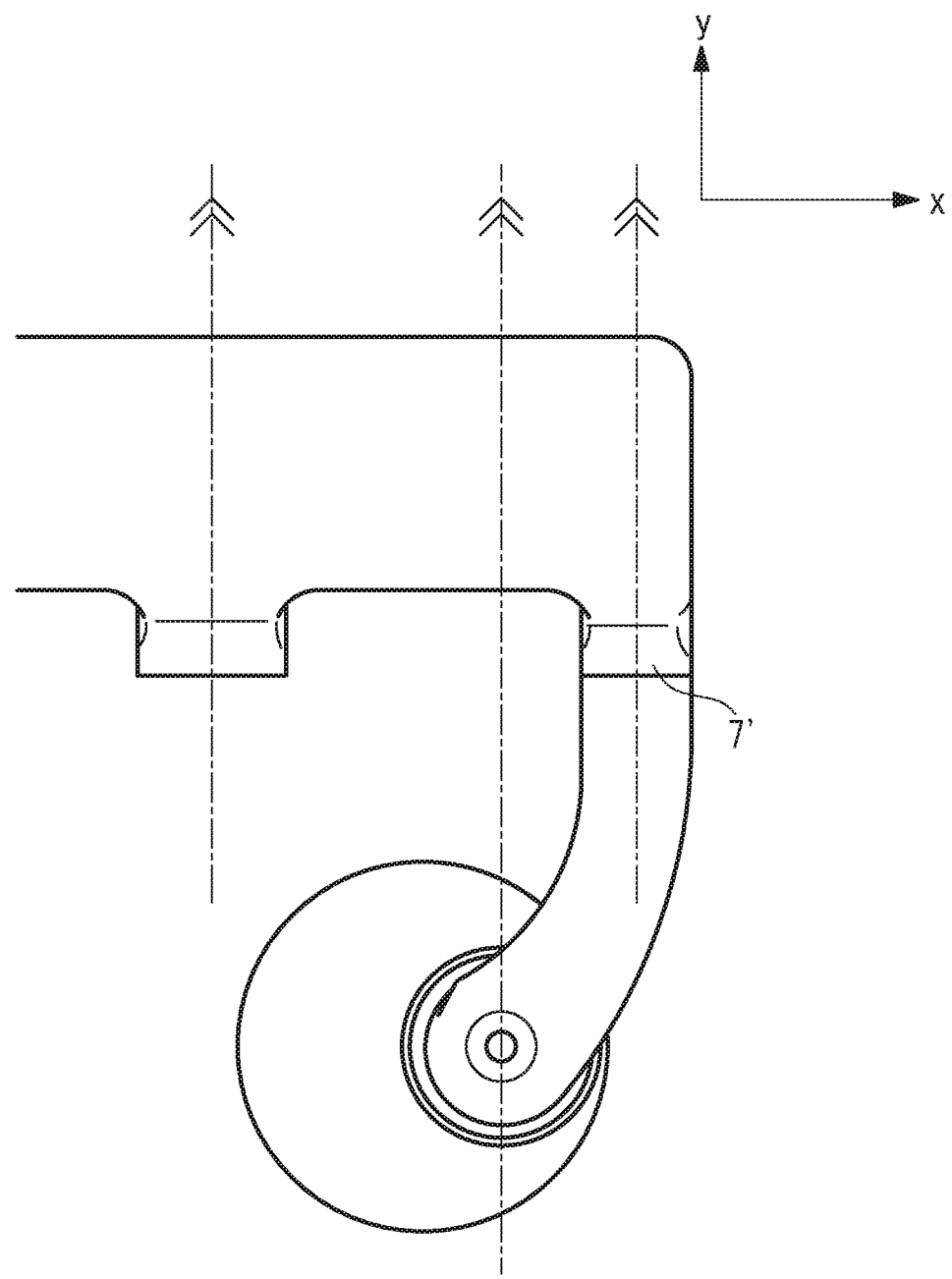
FIG. 3 is a partially enlarged plan view illustrating a vicinity of an air supply port as Comparative Example of FIG. 2.

On the other hand, FIG. 3 illustrates Comparative Example of FIG. 2. In this Comparative Example, general air supply port shape is illustrated, and the inclination angle of a connecting part 7' of an air supply port is 0°. As is apparent from a comparison of FIG. 2 with FIG. 3, in this embodiment, the shapes of the connecting parts 7 which are inlets of the air supply ports 5 are simply changed with respect to Comparative Example, and the shapes of the swirl chamber introduction parts 11 located at the downstream sides of the air supply ports 5 are not changed.

As illustrated in FIG. 1, the inclination angle of the connecting part 7 of one of the air supply ports 5 is set to be larger than the inclination angles of the connecting parts 7 of other air supply ports 5 located on a side closer to the air supply inlet 3 than the one of the air supply ports 5. More specifically, the inclination angles are sequentially set such that the inclination angle of the connecting part 7 of the air supply port 5 located farther from the air supply inlet 3 as viewed from the air supply inlet 3 becomes larger. More specifically, a first connecting part 7 (#1) of a first air supply port 5 (#1) located at the first position from the air supply inlet 3, that is, at a left end does not have the inclination angle, and the inclination angle is 0°. Then, the inclination angles of a second connecting part (#2) to a sixth connecting part (#6) sequentially located far from the air supply inlet 3 as viewed from the air supply inlet 3 are set to sequentially become larger, that is, 6°, 12°, 18°, 24°, and 30°, respectively.

The inclination angles each are determined by a flow distribution of supplied air that flows into the swirl chambers 9. For example, the lower limit is any of 5°, 8°, and 10°, and the upper limit is any of 60°, 50°, and 30°.

Now, a method for manufacturing the internal combustion engine having the above configuration will be described.

In this embodiment, the air supply ports 5 are formed by connecting the connecting parts 7 and the swirl chamber introduction parts 11 after casting. That is, the connecting parts 7 are manufactured by an air supply manifold mold for forming the air supply manifold 1 (refer to reference numeral P1 of FIG. 4). On the other hand, the swirl chamber introduction parts 11 are manufactured by a cylinder head mold for forming the swirl chambers 9 and the ends of the cylinders 13 (refer to reference numeral P2 of FIG. 4). Thus, the connecting parts 7 and the swirl chamber introduction parts 11 are manufactured by respective different molds.

Now, operation and effects of the internal combustion engine and the method for manufacturing the same of this embodiment will be described.

As illustrated in FIG. 1, supplied air that is, for example, air, is supplied from the air supply inlet 3 into the air supply manifold 1. The supplied air introduced into the air supply manifold 1 flows in the respective air supply ports 5 while flowing into the x direction. The supplied air that flows into the respective air supply ports 5 flows into the connecting parts 7 that are the inlets of the air supply ports 5, and thereafter passes through the swirl chamber introduction parts 11 to flow into the swirl chambers 9. The supplied air that flows into each of the swirl chambers 9 turns around the central axis CL of the swirl chamber 9 to form a swirl, and flows into the cylinder 13 at the timing of opening the air supply valve (refer to FIG. 8) to form an air supply flow having a desired swirl ratio.

In this embodiment, as illustrated in FIG. 1 and FIG. 2, the connecting parts 7 of the air supply ports 5 are each inclined in the direction away from the air supply inlet 3 with respect to the y direction orthogonal to the x direction in which the air supply manifold 1 extends. Thus, the connecting parts 7 are inclined in the direction away from the air supply inlet 3, so that supplied air that flows into each of the air supply ports 5 is received at a predetermined attack angle by the outer wall 7a of the connecting part 7. Consequently, the main flows of the supplied air that flows into the air supply ports 5 come close to the outer walls 7a, and flow along the outer walls 7a. As a result, it is possible to obtain flow distributions in which the main flows flow along the outer walls 7a. Accordingly, supplied air having each flow distribution, in which the main flow flows along the outer wall 7a, flows into the swirl chamber 9. Therefore, it is possible to separate the main flows from the central axes CL being the turning centers of the swirl chambers 9 as large as possible to create drift currents, and it is possible to obtain desired swirl ratios.

Then, the inclination angle of the connecting part 7 of the one of the air supply ports 5 is made to be larger than the inclination angles of the connecting parts 7 of other air supply ports 5 located on the side close to air supply inlet 3, so that the connecting part 7 having the reduced dynamic pressure (that is, inertial force in the x direction) of the supplied air is formed to have a larger inclination angle, and the main flow of the supplied air can further flow along the side further closer to the outer wall 7a. Consequently, the flow distribution of supplied air flowing through the air supply port 5 can be adjusted in accordance with the positions of the respective air supply ports 5 in a manner similar to those of other air supply ports 5, and the flow distributions of supplied air flowing through the swirl chambers 9 can be equalized for the respective air supply ports 5. Therefore, the swirl ratios in the respective swirl chambers 9 become equal to each other. As a result, flow states of supplied air flowing into the cylinders 13 can be made equal for the respective cylinder 13. Thus, the equal air supply flows for the respective cylinders are obtained. Therefore, it is possible to make the combustion states of the respective cylinders coincide with each other, and it is possible to suppress the lowering of efficiency or the change of an exhaust gas characteristic.

As illustrated in FIG. 1, the inclination angles are sequentially set such that the inclination angle of the connecting part 7 of the air supply port 5 located farther from the air supply inlet 3 as viewed from the air supply inlet 3 becomes larger. This is because the dynamic pressure of supplied air reduces in accordance with a distance from the air supply inlet 3, and therefore the inclination angles of the connecting parts 7 of the air supply ports 5 are increased, and long flow distances are obtained. Consequently, the main flows of supplied air can be brought close to the outer walls 7a by utilizing inertial force of the supplied air, and therefore even when the dynamic pressure of supplied air is low, it is possible to obtain the flow distribution in which the main flow flows along the outer wall 7a. Therefore, the inclination angles are sequentially set such that the inclination angle of the connecting part 7 of the air supply port 5 located farther from the air supply inlet 3 as viewed from the air supply inlet 3 and having lower dynamic pressure becomes larger, so that the flow distributions of supplied air flowing into the respective swirl chambers 9 can be made equal, and it is possible to obtain the equal air supply flows for the respective cylinders 13.

The respective combustion states of the cylinders 13 can be uniformized by simple change such as the inclination of the connecting parts 7 of the air supply ports 5, and therefore significant design change such as change in the shapes of all the air supply ports 5 is not required.

Additionally, compared to an internal combustion engine that performs combustion control for controlling ignition timing for each cylinder, such combustion control can be omitted. Therefore, it is possible to provide an internal combustion engine with a low cost.

Figure 4:
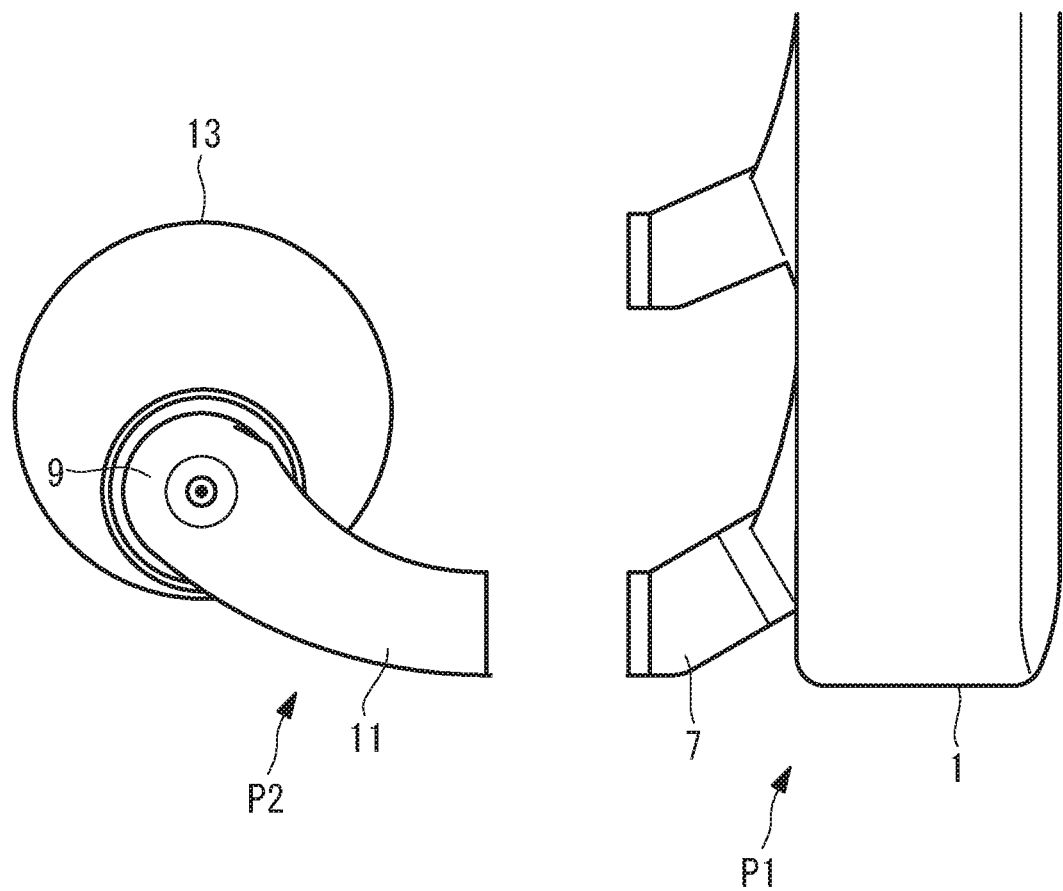
FIG. 4 is a partially enlarged plan view illustrating a method for manufacturing the internal combustion engine according to the embodiment of the present invention.

As illustrated in FIG. 4, the connecting parts 7 are manufactured by the air supply manifold mold for forming the air supply manifold 1, and the swirl chamber introduction parts 11 are manufactured by the cylinder head mold for forming the swirl chambers 9 and the ends of the cylinders 13. The reason is as follows. The cylinder head mold for forming the swirl chambers 9 and the ends of the cylinders 13 is a mold for determining the shape of a main body side of the internal combustion engine, and therefore it is difficult to frequently change the design of the cylinder head mold. On the other hand, the shape of the air supply manifold mold can be determined separately from the main body of the internal combustion engine, and therefore the design of the air supply manifold mold can be frequently changed compared to the design of the cylinder head mold. Therefore, in this embodiment, the air supply ports 5 are divided into the connecting parts 7 and the swirl chamber introduction parts 11, so that the swirl chamber introduction parts 11 of the air supply ports 5, without the change of the shapes, are manufactured by the cylinder head mold, and the connecting parts 7 of the air supply ports 5, accompanying the change of the shapes, are manufactured by the air supply manifold mold. Consequently, it is possible to manufacture the air supply manifold including the connecting parts 7 of the air supply ports 5 with desired shapes, at a low cost.

In the above embodiment, the inclination angles are sequentially set such that the inclination angle of the connecting part 7 located farther from the air supply inlet 3 as viewed from the air supply inlet 3 becomes larger, as illustrated in FIG. 1. However, the present invention is not limited to this.

Figure 5:
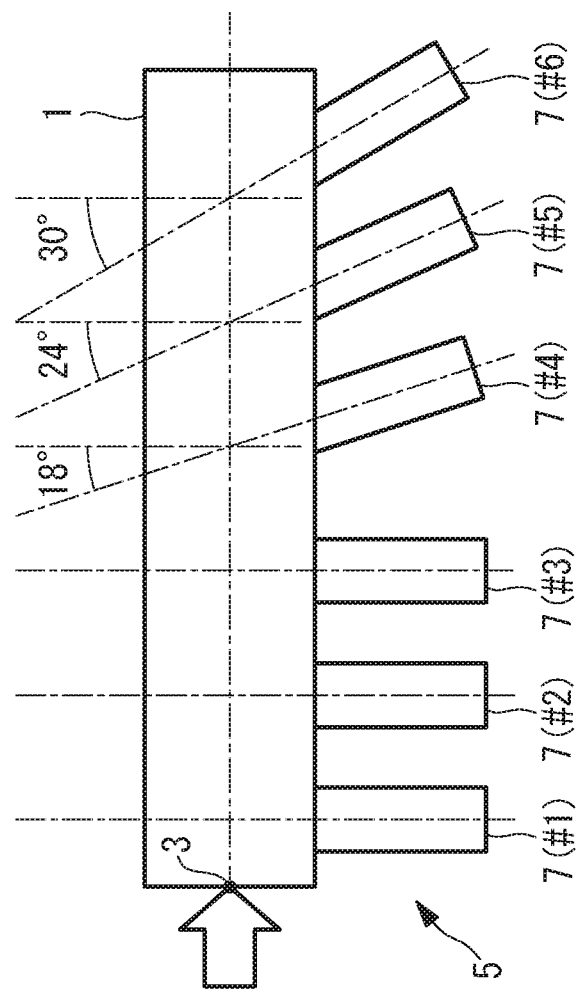
FIG. 5 is a plan view illustrating a first modification of FIG. 1.

For example, only connecting parts 7 that have little tendency that the dynamic pressure of supplied air introduced from the air supply inlet 3 is reduced and supplied air flowing into the connecting parts 7 of the air supply ports 5 flows toward the outer walls 7a may be inclined. More specifically, as illustrated in FIG. 5, in a case where the dynamic pressure of a main flow of supplied air of each of the first air supply port to the third air supply port 5 (#3) is considered to be maintained at a predetermined value or more, only the connecting parts 7 of the fourth air supply port 5 (#4) to the sixth air supply port (#6) may be inclined.

Figure 6:
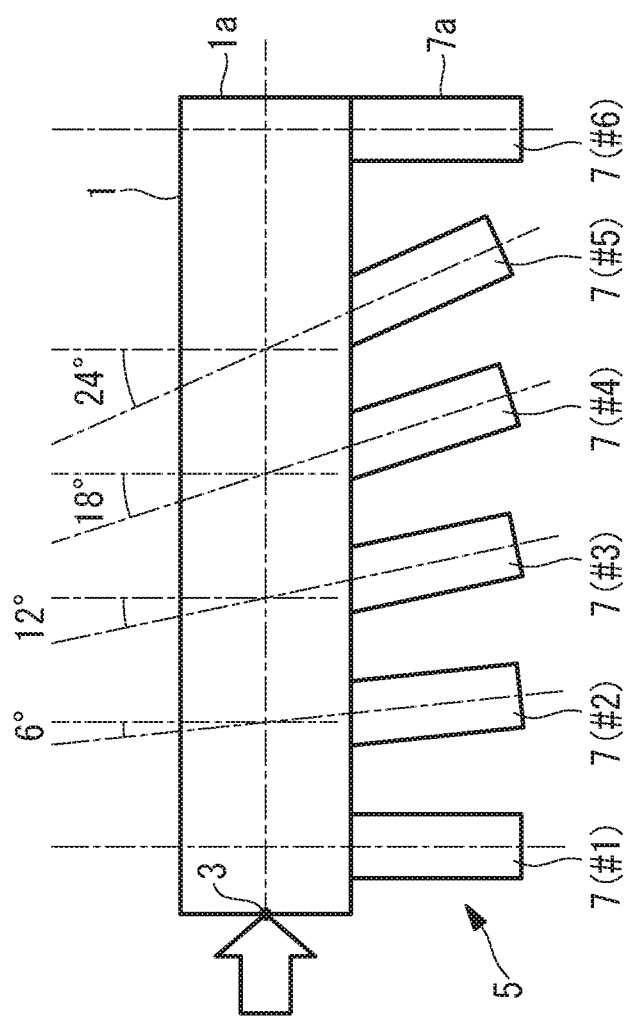
FIG. 6 is a plan view illustrating a second modification of FIG. 1.

As illustrated in FIG. 6, in a case where the outer wall 7a of the sixth air supply port 5 (#6) is continuously connected to a downstream end wall 1a located at a lowermost stream of the air supply manifold 1, supplied air that collides with the downstream end wall 1a flows along the continuously connected outer wall 7a, and a flow distribution in which a main flow flows along the outer wall 7a is obtained, and therefore the connecting part 7 (#6) of the sixth air supply port 5 does not need to have the inclination angle.

In this embodiment, the internal combustion engine including the six cylinders is described as an example. However, the present invention is not limited to this, and the number of cylinders may be not less than two and not more than five, or may be seven or more.

In this embodiment, the internal combustion engine is described as having a configuration in which air is supplied from one place to the one cylinder 13. However, the present invention is not limited to this, and air may be supplied from a plurality of places to the one cylinder 13.

REFERENCE SIGNS LIST 1 air supply manifold
3 air supply inlet
5 air supply port
7 connecting part
7a outer wall
9 swirl chamber
11 swirl chamber introduction part
13 cylinder

The invention claimed is:

1. An internal combustion engine comprising:
an air supply manifold extending in one direction;
a plurality of cylinders arranged at a predetermined interval in the one direction in which the air supply manifold extends;
a plurality of swirl chambers connected to ends of the respective cylinders to form swirls; and
an air supply port including a connecting part arranged on one side surface of the air supply manifold and a swirl chamber introduction part that connects the connecting part and the swirl chamber in a downstream side of the connecting part, a plurality of air supply ports being provided with respect to the air supply manifold, wherein
an air supply inlet for supplying air into the air supply manifold is provided on an end of the air supply manifold,
air that is supplied from the air supply inlet to the air supply manifold flows along the one direction in which the air supply manifold extends,
connecting parts of respective air supply ports are arranged on the one side surface of the air supply manifold along the one direction in which the air supply manifold extends at an interval in the one direction,
a central axis of the connecting part of one of the air supply ports inclines with a predetermined inclination angle in a direction away from the air supply inlet with respect to an orthogonal direction orthogonal to the one direction in which the air supply manifold extends, and
the inclination angle of the central axis of the connecting part of the one of the air supply ports provided on the air supply manifold is larger than an inclination angle of the central axis of the connecting part of other air supply ports located on a side closer to the air supply inlet than the one of the air supply ports.

2. The internal combustion engine according to claim 1, wherein
the inclination angles are sequentially set such that the inclination angle of the connecting part of the air supply port located farther from the air supply inlet is greater than the inclination angles of the central axis of the air supply ports located closer to the air supply inlet.

3. The internal combustion engine according to claim 1, wherein
the connecting parts are manufactured by an air supply manifold mold for forming the air supply manifold, and
the swirl chamber introduction parts are manufactured by a cylinder head mold for forming the swirl chambers and the ends of the cylinders.

4. A method for manufacturing an internal combustion engine, the internal combustion engine including:
an air supply manifold extending in one direction;
a plurality of cylinders arranged at a predetermined interval in the one direction in which the air supply manifold extends;
a plurality of swirl chambers connected to ends of the respective cylinders to form swirls; and
an air supply port including a connecting part arranged on one side surface of the air supply manifold and a swirl chamber introduction part that connects the connecting part and the swirl chamber in a downstream side of the connecting part, a plurality of air supply ports being provided with respect to the air supply manifold, wherein
an air supply inlet for supplying air into the air supply manifold is provided on an end of the air supply manifold,
air that is supplied from the air supply inlet to the air supply manifold flows along the one direction in which the air supply manifold extends,
connecting parts of respective air supply ports are arranged on the one side surface of the air supply manifold along the one direction in which the air supply manifold extends at an interval in the one direction,
a central axis of the connecting part of one of the air supply ports inclines with a predetermined inclination angle in a direction away from the air supply inlet with respect to an orthogonal direction orthogonal to the one direction in which the air supply manifold extends, the inclination angle of the central axis of the connecting part of the one of the air supply ports provided on the air supply manifold is larger than an inclination angle of the central axis of the connecting part of other air supply ports located on a side closer to the air supply inlet than the one of the air supply ports, the method comprising:
- a connecting part manufacturing step of manufacturing the connecting parts by an air supply manifold mold for forming the air supply manifold;
- a swirl chamber introduction part manufacturing step of manufacturing the swirl chamber introduction parts by a cylinder head mold for forming the swirl chamber and the ends of the cylinder; and
- an air supply port manufacturing step of connecting the connecting parts and the swirl chamber introduction parts to manufacture the air supply ports.

5. The internal combustion engine according to claim 2, wherein
the air supply ports are formed by connecting the connecting parts and the swirl chamber introduction parts located on sides closer to the swirl chambers than the connecting parts,
the connecting parts are manufactured by an air supply manifold mold for forming the air supply manifold, and
the swirl chamber introduction parts are manufactured by a cylinder head mold for forming the swirl chambers and the ends of the cylinders.

* * * * *